US011862120B1

(12) United States Patent
Hai

(10) Patent No.: US 11,862,120 B1
(45) Date of Patent: Jan. 2, 2024

(54) METHOD FOR CALCULATING A CHROMATICITY VALUE OF A WHITE SCREEN OF A DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Bo Hai, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/822,783

(22) Filed: Aug. 27, 2022

(30) Foreign Application Priority Data

Jul. 21, 2022 (CN) ......................... 202210863861.7

(51) Int. Cl.
*G09G 3/36* (2006.01)
*G09G 5/02* (2006.01)

(52) U.S. Cl.
CPC ............. *G09G 3/3607* (2013.01); *G09G 5/02* (2013.01); *G09G 2320/0242* (2013.01); *G09G 2320/0276* (2013.01); *G09G 2360/16* (2013.01)

(58) Field of Classification Search
CPC ................... G09G 3/3607; G09G 5/02; G09G 2320/0242; G09G 2360/16
See application file for complete search history.

(56) References Cited

U.S. PATENT DOCUMENTS

2013/0020933 A1* 1/2013 Levermore .......... H10K 59/351 313/504
2016/0131968 A1* 5/2016 Okamoto .............. H01S 5/0683 315/151
2019/0255807 A1* 8/2019 Isojima .................... G02B 5/30

* cited by examiner

*Primary Examiner* — Robert J Michaud
(74) *Attorney, Agent, or Firm* — PV IP PC; Wei Te Chung; Zhigang Ma

(57) ABSTRACT

The present disclosure relates to a method for calculating a chromaticity value of a white screen of a display device. The method for calculating the chromaticity value of the white screen of the display device of the present disclosure can calculate a corresponding chromaticity value of the white screen, when aperture ratios of a first sub-pixel, a second sub-pixel, and a third sub-pixel of the display device are adjusted. Then, the aperture ratios of the first sub-pixel, the second sub-pixel, and the third sub-pixel of the display device can be adjusted, so as to meet user demand for chromaticity of the white screen, ameliorate a color cast problem of current display devices, and improve a display effect of the display device.

13 Claims, 1 Drawing Sheet

METHOD FOR CALCULATING A CHROMATICITY VALUE OF A WHITE SCREEN OF A DISPLAY DEVICE

CROSS-REFERENCE TO RELATED APPLICATIONS

This application claims priority to Chinese Patent Application No. 202210863861.7 filed on Jul. 21, 2022, titled "METHOD FOR CALCULATING A CHROMATICITY VALUE OF A WHITE SCREEN OF A DISPLAY DEVICE", which is incorporated by reference in its entirety in the present application.

TECHNICAL FIELD

The present application relates to a field of display technology, and in particular, to a method for calculating a chromaticity value of a white screen of a display device.

BACKGROUND

A liquid crystal display (LCD for short) takes a liquid crystal material as a basic component, and the liquid crystal material is filled between two parallel plates. The arrangement of molecules inside the liquid crystal material is changed through voltage to achieve light shading and light transmittance, thereby displaying well-proportioned images with various shades. As long as a filter layer of three primary colors is added between the two parallel plates, a display of color images can be realized.

At present, when using a liquid crystal display device, users find that there is a color cast in a 255-level white screen of the liquid crystal display device, which needs to be improved. A chromaticity value of the white screen of the current liquid crystal display device is determined by both a liquid crystal display panel and a backlight source. Considering that the backlight source needs to be compatible with screens of different users and cost of adjusting the backlight source is relatively high, it is necessary to adjust the liquid crystal display panel to meet requirements of the chromaticity value of the white screen of the liquid crystal display device.

SUMMARY

The purpose of the present disclosure is to provide a method for calculating a chromaticity value of a white screen of a display device, which can solve a problem of a color cast in the white screen of current liquid crystal display devices.

In order to solve the above problems, the present disclosure provides a method for calculating a chromaticity value of a white screen of a display device, which includes the following steps: S10: acquiring initial spectrum values of a first sub-pixel, a second sub-pixel, a third sub-pixel, and a backlight source of an initial display device, and calculating an initial transmittance spectrum value of a white screen of a display panel of an initial display device; S20: acquiring initial aperture ratios of the first sub-pixel, the second sub-pixel, and the third sub-pixel of the initial display device, presetting test aperture ratios of the first sub-pixel, the second sub-pixel, and the third sub-pixel of a test display device, and calculating relative variations of the test aperture ratios of the first sub-pixel, the second sub-pixel, and the third sub-pixel relative to the initial aperture ratios of the first sub-pixel, the second sub-pixel, and the third sub-pixel, respectively; S30: calculating a test transmittance spectrum value of a white screen of a display panel of the test display device according to the initial transmittance spectrum value of the white screen and the relative variations of the test aperture ratios relative to the initial aperture ratios; S40: calculating tristimulus values of the test display device according to the test transmittance spectrum value of the white screen of the display panel; and S50: calculating a chromaticity value of a white screen of the test display device according to the tristimulus values.

Further, in the step S10, the initial transmittance spectrum value of the white screen of the display panel of the initial display device is equal to dividing a sum of the initial spectrum value of the first sub-pixel, the initial spectrum value of the second sub-pixel, and the initial spectrum value of the third sub-pixel by the initial spectrum value of the backlight source.

Further, in the step S20, the relative variation of the test aperture ratio of the first sub-pixel relative to the initial aperture ratio of the first sub-pixel is equal to dividing the test aperture ratio of the first sub-pixel by the initial aperture ratio of the first sub-pixel.

Further, in the step S20, the relative variation of the test aperture ratio of the second sub-pixel relative to the initial aperture ratio of the second sub-pixel is equal to dividing the test aperture ratio of the second sub-pixel by the initial aperture ratio of the second sub-pixel.

Further, in the step S20, the relative variation of the test aperture ratio of the third sub-pixel relative to the initial aperture ratio of the third sub-pixel is equal to dividing the test aperture ratio of the third sub-pixel by the initial aperture ratio of the third sub-pixel.

Further, in the step S30, the test transmittance spectrum value of the white screen of the display panel of the test display device is equal to dividing a sum of the initial spectrum value of the first sub-pixel multiplied by the relative variation of the test aperture ratio of the first sub-pixel relative to the initial aperture ratio of the first sub-pixel, the initial spectrum value of the second sub-pixel multiplied by the relative variation of the test aperture ratio of the second sub-pixel relative to the initial aperture ratio of the second sub-pixel, and the initial spectrum value of the third sub-pixel multiplied by the relative variation of the test aperture ratio of the third sub-pixel relative to the initial aperture ratio of the third sub-pixel, by the initial spectrum value of the backlight source.

Further, in the step S40, the tristimulus values comprise a red primary color tristimulus value X, a green primary color tristimulus value Y, and Blue primary color tristimulus value Z, and the red primary color tristimulus value X, the green primary color tristimulus value Y, and the blue primary color tristimulus value Z are calculated according to following formulas:

$$X=k\int_{\lambda}S(\lambda)\cdot P(\lambda)\cdot\bar{x}(\lambda)d\lambda,$$

$$Y=k\int\lambda S(\lambda)\cdot P(\lambda)\cdot\bar{y}(\lambda)d\lambda,$$

$$Z=k\int_{\lambda}S(\lambda)\cdot P(\lambda)\cdot\bar{z}(\lambda)d\lambda;$$

wherein k is a tuning coefficient, λ is a wavelength, S(L) is the initial spectrum value of the backlight source of the initial display device, P(λ) is the test transmittance spectrum value of the white screen of the display panel of the test display device, $\bar{x}(\lambda)$, $\bar{y}(\lambda)$, and $\bar{z}(\lambda)$ are respectively three spectrum tristimulus values of Standard Observer, and dλ represents a differential of the wavelength.

Further, in the step S50, the chromaticity value of the white screen of the test display device comprises a horizontal coordinate Wx and a vertical coordinate Wy.

Further, the horizontal coordinate Wx is calculated according to the following formula $$Wx = \frac{X}{X+Y+Z}.$$

Further, the vertical coordinate Wy is calculated according to the following formula $$Wy = \frac{Y}{X+Y+Z}.$$

The advantage of the present disclosure is that the method for calculating the chromaticity value of the white screen of the display device of the present disclosure can calculate the corresponding chromaticity value of the white screen, when the aperture ratios of the first sub-pixel, the second sub-pixel, and the third sub-pixel of the display device are adjusted. Then, the aperture ratios of the first sub-pixel, the second sub-pixel, and the third sub-pixel of the display device can be adjusted, so as to meet users' demand for chromaticity of the white screen, ameliorate a color cast problem of current display devices, and improve a display effect of the display device.

DESCRIPTION OF DRAWINGS

In order to illustrate the technical solution in the embodiments of the present application more clearly, the drawings that are used in the description of the embodiments are briefly introduced in the following. Obviously, the drawings in the following description are only some embodiments of the present application. For those skilled in the art, other drawings can also be obtained from these drawings without creative effort.

DESCRIPTION OF REFERENCE NUMBERS

Figure 1:
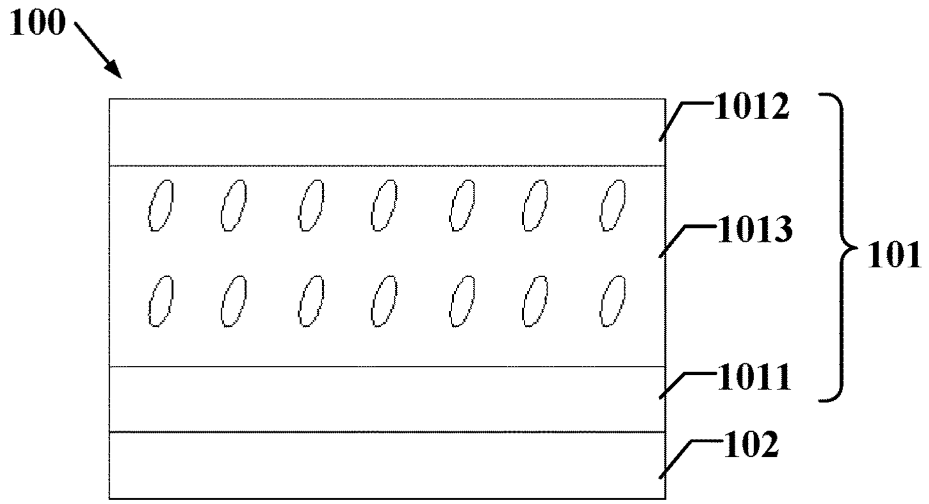
FIG. 1 is a schematic structural diagram of a display device of the present disclosure.

100: display device;
101: display panel; 102: backlight source;
1011: array substrate; 1012: color filter substrate;
1013: liquid crystal layer.

DETAILED DESCRIPTION OF PREFERRED EMBODIMENTS

The preferred embodiments of the present disclosure will be described in detail below with reference to the accompanying drawings, so as to fully introduce the technical content of the present disclosure to those skilled in the art, to exemplify that the present disclosure may be implemented, to make the technical content disclosed in the present disclosure clearer, and to make those skilled in the art understand how to implement the present disclosure more readily. However, the present disclosure can be embodied in many different forms of embodiments, the protection scope of the present disclosure is not limited to the embodiments mentioned herein, and the description of the following embodiments is not intended to limit the scope of the present disclosure.

The directional terms mentioned in the present disclosure, such as "up", "down", "front", "rear", "left", "right", "inside", "outside", and "side", are only directions in the drawing. The directional terms used herein are used to explain and describe the present disclosure, rather than to limit the protection scope of the present disclosure.

In the drawings, structurally same components are denoted by a same numeral, and structurally or functionally similar components are denoted by similar numerals throughout. In addition, for ease of understanding and description, the size and thickness of each component shown in the accompanying drawings are arbitrarily shown, and the present disclosure does not limit the size and thickness of each component.

Embodiment 1

As shown in FIG. 1, the present embodiment provides a display device 100. The display device 100 includes: a display panel 101 and a backlight source 102.

As shown in FIG. 1, the display panel 101 includes an array substrate 1011, a color filter substrate 1012, and a liquid crystal layer 1013.

The array substrate 1011 includes a film layer such as a thin film transistor (not shown in figure).

The color filter substrate 1012 is disposed opposite to the array substrate 1011. The color filter substrate 1012 includes: a black matrix (not shown in figure), a color filter (not shown in figure), and other film layers.

The liquid crystal layer 1013 is disposed between the array substrate 1011 and the color filter substrate 1012.

The backlight source 102 is disposed on a side of the array substrate 1011 away from the color filter substrate 1012. The backlight source 102 can be an edge-type backlight source or a direct-type backlight source.

Figure 2:
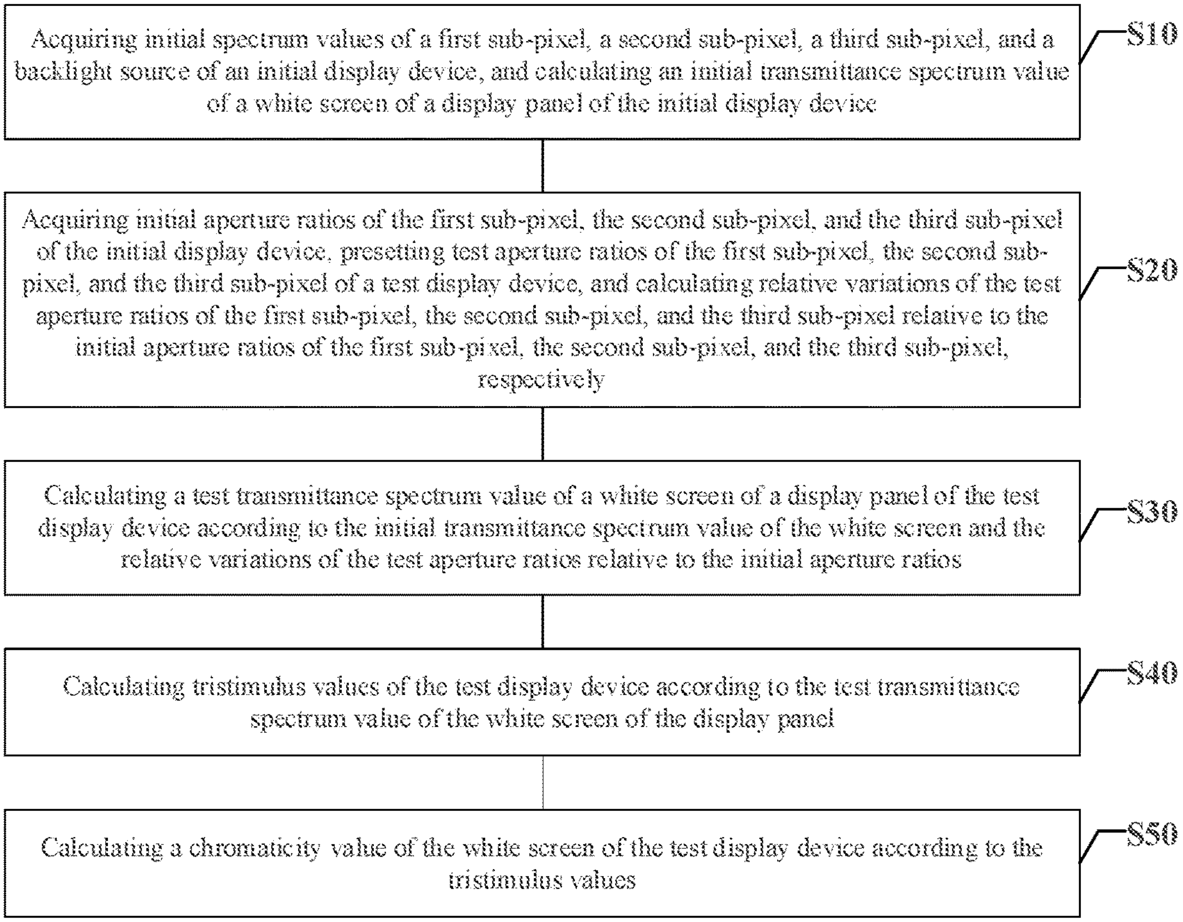
FIG. 2 is a step diagram of a method for adjusting chromaticity of the display device of the present disclosure.

As shown in FIG. 2, the present embodiment also provides a method for adjusting chromaticity of the display device of the present embodiment, which includes following steps:

S10: acquiring initial spectrum values of a first sub-pixel, a second sub-pixel, a third sub-pixel, and a backlight source of an initial display device, and calculating an initial transmittance spectrum value of a white screen of a display panel of the initial display device;

S20: acquiring initial aperture ratios of the first sub-pixel, the second sub-pixel, and the third sub-pixel of the initial display device, presetting test aperture ratios of the first sub-pixel, the second sub-pixel, and the third sub-pixel of a test display device, and calculating relative variations of the test aperture ratios of the first sub-pixel, the second sub-pixel, and the third sub-pixel relative to the initial aperture ratios of the first sub-pixel, the second sub-pixel, and the third sub-pixel, respectively;

S30: calculating a test transmittance spectrum value of a white screen of a display panel of the test display device according to the initial transmittance spectrum value of the white screen and the relative variations of the test aperture ratios relative to the initial aperture ratios;

S40: calculating tristimulus values of the test display device according to the test transmittance spectrum value of the white screen of the display panel; and

S50: calculating a chromaticity value of a white screen of the test display device according to the tristimulus values.

In the present embodiment, in the step S10, the initial spectrum values of the first sub-pixel, the second sub-pixel, and the third sub-pixel of the initial display device at a gray scale of 255 are obtained. In other embodiments, the initial spectrum values of the first sub-pixel, the second sub-pixel, and the third sub-pixel of the initial display device at other gray scales may also be acquired.

The first sub-pixel, the second sub-pixel, and the third sub-pixel are respectively one of a red sub-pixel, a green sub-pixel, and a blue sub-pixel. The colors of the first sub-pixel, the second sub-pixel, and the third sub-pixel are different from each other. In the present embodiment, the first sub-pixel, the second sub-pixel, and the third sub-pixel are respectively the red sub-pixel, the green sub-pixel, and the blue sub-pixel.

In the step S10, the initial transmittance spectrum value of the white screen of the display panel of the initial display device is equal to dividing a sum of the initial spectrum value of the first sub-pixel, the initial spectrum value of the second sub-pixel, and the initial spectrum value of the third sub-pixel by the initial spectrum value of the backlight source.

For example, the initial spectrum value of the first sub-pixel of the initial display device is 0.000383, the initial spectrum value of the second sub-pixel of the initial display device is 0.000028, and the initial spectrum value of the third sub-pixel of the initial display device is 0.000374. The initial spectrum value of the backlight source of the initial display device is 0.000328. At this time, the initial transmittance spectrum value of the white screen of the display panel of the initial display device=(0.000383+0.000028+0.000374)/0.000328=2.393.

In the step S20, the relative variation of the test aperture ratio of the first sub-pixel relative to the initial aperture ratio of the first sub-pixel is equal to dividing the test aperture ratio of the first sub-pixel by the initial aperture ratio of the first sub-pixel. The relative variation of the test aperture ratio of the second sub-pixel relative to the initial aperture ratio of the second sub-pixel is equal to dividing the test aperture ratio of the second sub-pixel by the initial aperture ratio of the second sub-pixel. The relative variation of the test aperture ratio of the third sub-pixel relative to the initial aperture ratio of the third sub-pixel is equal to dividing the test aperture ratio of the third sub-pixel by the initial aperture ratio of the third sub-pixel.

For example, the initial aperture ratio of the first sub-pixel of the initial display device is 60%, the initial aperture ratio of the second sub-pixel of the initial display device is 60%, and the initial aperture ratio of the third sub-pixel of the initial display device is 60%.

The test aperture ratio of the first sub-pixel of the test display device is 62%, the test aperture ratio of the second sub-pixel of the test display device is 64%, and the test aperture ratio of the third sub-pixel of the test display device is 66%. The relative variation of the test aperture ratio of the first sub-pixel relative to the initial aperture ratio of the first sub-pixel=62%/60%=103.3%; the relative variation of the test aperture ratio of the second sub-pixel relative to the initial aperture ratio of the second sub-pixel=64%/60%=106.7%; the relative variation of the test aperture ratio of the third sub-pixel relative to the initial aperture ratio of the third sub-pixel=66%/60%=110%.

In the step S30, the test transmittance spectrum value of the white screen of the display panel of the test display device is equal to dividing a sum of the initial spectrum value of the first sub-pixel multiplied by the relative variation of the test aperture ratio of the first sub-pixel relative to the initial aperture ratio of the first sub-pixel, the initial spectrum value of the second sub-pixel multiplied by the relative variation of the test aperture ratio of the second sub-pixel relative to the initial aperture ratio of the second sub-pixel, and the initial spectrum value of the third sub-pixel multiplied by the relative variation of the test aperture ratio of the third sub-pixel relative to the initial aperture ratio of the third sub-pixel, by the initial spectrum value of the backlight source.

The test transmittance spectrum value of the white screen of the display panel of the test display device=(0.000383*103.3%+0.000028*106.7%+0.000374*110%)/0.000328=2.552.

In the step S40, the tristimulus values comprise a red primary color tristimulus value X, a green primary color tristimulus value Y, and a blue primary color tristimulus value Z, and the red primary color tristimulus value X, the green primary color tristimulus value Y, and the blue primary color tristimulus value Z are calculated according to following formulas: $X=k\int_{\lambda}S(\lambda)\cdot P(\lambda)\cdot\bar{x}(\lambda)d\lambda$, $Y=k\int_{\lambda}S(\lambda)\cdot P(\lambda)\cdot\bar{z}(\lambda)d\lambda$, $Z=k\int_{\lambda}S(\lambda)\cdot P(\cdot)\cdot\bar{z}(\lambda)d\lambda$; a wherein k is a tuning coefficient, λ is a wavelength, S(λ) is the initial spectrum value of the backlight source of the initial display device, P(λ) is the test transmittance spectrum value of the white screen of the display panel of the test display device, $\bar{x}(\lambda)$, $\bar{y}(\lambda)$, and $\bar{z}(\lambda)$ are respectively three spectrum tristimulus values of Standard Observer, and dλ represents a differential of the wavelength.

In the step S50, the chromaticity value of the white screen of the test display device comprises a horizontal coordinate Wx and a vertical coordinate Wy. The horizontal coordinate Wx of the chromaticity value of the white screen of the test display device is calculated according to the following formula $$Wx = \frac{X}{X+Y+Z}.$$

The vertical coordinate Wy of the chromaticity value of the white screen of the test display device is calculated according to the following formula $$Wy = \frac{Y}{X+Y+Z}.$$

The method for calculating the chromaticity value of the white screen of the display device of the present embodiment can calculate a corresponding chromaticity value of the white screen, when the aperture ratios of the first sub-pixel, the second sub-pixel, and the third sub-pixel of the display device are adjusted. Then, the aperture ratios of the first sub-pixel, the second sub-pixel, and the third sub-pixel of the display device can be adjusted, so as to meet user demand for chromaticity of the white screen, ameliorate a color cast problem of current display devices, and improve a display effect of the display device. Further, the method for calculating the chromaticity value of the white screen of the display device provided by the present application has been described in detail above. Specific examples are used herein to describe the principle and implementation of the present application. The description is only used to help to understand the method of the present application and the core idea thereof. Meanwhile, for those skilled in the art, according to the spirit of the present application, there will be changes in specific embodiments and application scopes. In summary, the content of the present application should not be construed to limit the present application.

What is claimed is:

1. A method for calculating a chromaticity value of a white screen of a display device, comprising:

acquiring initial spectrum values of a first sub-pixel, a second sub-pixel, a third sub-pixel, and a backlight source of an initial display device, and calculating an initial transmittance spectrum value of a white screen of a display panel of the initial display device by dividing a sum of the initial spectrum value of the first sub-pixel, the initial spectrum value of the second sub-pixel, and the initial spectrum value of the third sub-pixel by the initial spectrum value of the backlight source;

acquiring initial aperture ratios of the first sub-pixel, the second sub-pixel, and the third sub-pixel of the initial display device, presetting test aperture ratios of the first sub-pixel, the second sub-pixel, and the third sub-pixel of a test display device, and calculating relative variations of the test aperture ratios of the first sub-pixel, the second sub-pixel, and the third sub-pixel relative to the initial aperture ratios of the first sub-pixel, the second sub-pixel, and the third sub-pixel, respectively;

calculating a test transmittance spectrum value of a white screen of a display panel of the test display device according to the initial transmittance spectrum value and the relative variations of the test aperture ratios relative to the initial aperture ratios;

calculating tristimulus values of the test display device according to the test transmittance spectrum value; and calculating the chromaticity value of the white screen of the test display device according to the tri stimulus values.

2. The method for calculating the chromaticity value of the white screen of the display device of claim 1, wherein the relative variation of the test aperture ratio of the first sub-pixel relative to the initial aperture ratio of the first sub-pixel is equal to calculated by dividing the test aperture ratio of the first sub-pixel by the initial aperture ratio of the first sub-pixel.

3. The method for calculating the chromaticity value of the white screen of the display device of claim 1, wherein the relative variation of the test aperture ratio of the second sub-pixel relative to the initial aperture ratio of the second sub-pixel is calculated by dividing the test aperture ratio of the second sub-pixel by the initial aperture ratio of the second sub-pixel.

4. The method for calculating the chromaticity value of the white screen of the display device of claim 1, wherein the relative variation of the test aperture ratio of the third sub-pixel relative to the initial aperture ratio of the third sub-pixel is equal to calculated by dividing the test aperture ratio of the third sub-pixel by the initial aperture ratio of the third sub-pixel.

5. The method for calculating the chromaticity value of the white screen of the display device of claim 1, wherein the test transmittance spectrum value of the white screen of the display panel of the test display device is calculated by dividing a sum of the initial spectrum value of the first sub-pixel multiplied by the relative variation of the test aperture ratio of the first sub-pixel relative to the initial aperture ratio of the first sub-pixel, the initial spectrum value of the second sub-pixel multiplied by the relative variation of the test aperture ratio of the second sub-pixel relative to the initial aperture ratio of the second sub-pixel, and the initial spectrum value of the third sub-pixel multiplied by the relative variation of the test aperture ratio of the third sub-pixel relative to the initial aperture ratio of the third sub-pixel, by the initial spectrum value of the backlight source.

6. The method for calculating the chromaticity value of the white screen of the display device of claim 1, wherein in the step S40, the tristimulus values comprise a red primary color tristimulus value X, a green primary color tristimulus value Y, and a blue primary color tristimulus value Z, and the red primary color tristimulus value X, the green primary color tristimulus value Y, and the blue primary color tristimulus value Z are calculated according to following formulas:

$$X=k\int_{\lambda}S(\lambda)\cdot P(\lambda)\cdot\bar{x}(\lambda)d\lambda,$$

$$Y=k\int\lambda S(\lambda)\cdot P(\lambda)\cdot\bar{y}(\lambda)d\lambda,$$

$$Z=k\int_{\lambda}S(\lambda)\cdot P(\lambda)\cdot\bar{z}(\lambda)d\lambda;$$

wherein k is a tuning coefficient, λ is a wavelength, S(λ) is the initial spectrum value of the backlight source of the initial display device, P(λ) is the test transmittance spectrum value of the white screen of the display panel of the test display device, $\bar{x}(\lambda)$, $\bar{y}(\lambda)$, and $\bar{z}(\lambda)$ are respectively three spectrum tristimulus values of Standard Observer, and dλ represents a differential of the wavelength.

7. The method for calculating the chromaticity value of the white screen of the display device of claim 6, wherein the chromaticity value of the white screen of the test display device comprises a horizontal coordinate Wx and a vertical coordinate Wy.

8. The method for calculating the chromaticity value of the white screen of the display device of claim 7, wherein the horizontal coordinate Wx is calculated according to a following formula $$Wx=\frac{X}{X+Y+Z}.$$

9. The method for calculating the chromaticity value of the white screen of the display device of claim 7, wherein the vertical coordinate Wy is calculated according to a following formula $$Wy=\frac{Y}{X+Y+Z}.$$

10. A method for calculating a chromaticity value of a white screen of a display device, comprising:

acquiring initial spectrum values of a first sub-pixel, a second sub-pixel, a third sub-pixel, and a backlight source of an initial display device, and calculating an initial transmittance spectrum value of a white screen of a display panel of the initial display device;

acquiring initial aperture ratios of the first sub-pixel, the second sub-pixel, and the third sub-pixel of the initial display device, presetting test aperture ratios of the first sub-pixel, the second sub-pixel, and the third sub-pixel of a test display device, and calculating relative variations of the test aperture ratios of the first sub-pixel, the second sub-pixel, and the third sub-pixel relative to the initial aperture ratios of the first sub-pixel, the second sub-pixel, and the third sub-pixel, respectively;

calculating a test transmittance spectrum value of a white screen of a display panel of the test display device according to the initial transmittance spectrum value and the relative variations of the test aperture ratios relative to the initial aperture ratios;

calculating tristimulus values of the test display device according to the test transmittance spectrum value, wherein the tristimulus values of the test display device comprise a red primary color tristimulus value X, a green primary color tristimulus value Y, and a blue primary color tristimulus value Z, and the red primary color tristimulus value X, the green primary color tristimulus value Y, and the blue primary color tristimulus value Z are calculated according to following formulas:

$$X=k\int_{\lambda}S(\lambda)\cdot P(\lambda)\cdot\bar{x}(\lambda)d\lambda,$$

$$Y=k\int\lambda S(\lambda)\cdot P(\lambda)\cdot\bar{y}(\lambda)d\lambda,$$

$$Z=k\int_{\lambda}S(\lambda)\cdot P(\lambda)\cdot\bar{z}(\lambda)d\lambda;$$

wherein k is a tuning coefficient, λ is a wavelength, S(λ) is the initial spectrum value of the backlight source of the initial display device, P(λ) is the test transmittance spectrum value of the white screen of the display panel of the test display device, $\bar{x}(\lambda)$, $\bar{y}(\lambda)$, and $\bar{z}(\lambda)$ are respectively three spectrum tristimulus values of Standard Observer, and dλ represents a differential of the wavelength; and calculating the chromaticity value of the white screen of the test display device according to the tristimulus values.

11. The method for calculating the chromaticity value of the white screen of the display device of claim 10, wherein the chromaticity value of the white screen of the test display device comprises a horizontal coordinate Wx and a vertical coordinate Wy.

12. The method for calculating the chromaticity value of the white screen of the display device of claim 11, wherein the horizontal coordinate Wx is calculated according to a following formula $$Wx=\frac{X}{X+Y+Z}.$$

13. The method for calculating the chromaticity value of the white screen of the display device of claim 11, wherein the vertical coordinate Wy is calculated according to a following formula $$Wy=\frac{Y}{X+Y+Z}.$$

* * * * *